United States Patent [19]

Thompson

[11] 3,805,290

[45] Apr. 16, 1974

[54] RECORDING HEAD FLEXURE

[75] Inventor: Herbert E. Thompson, Los Gatos, Calif.

[73] Assignee: Memorex Corporation, Santa Clara, Calif.

[22] Filed: Oct. 24, 1972

[21] Appl. No.: 300,273

[52] U.S. Cl. .............................................. 360/103

[51] Int. Cl. .............................................. G11b 5/60

[58] Field of Search............... 340/174.1 E, 174.1 F; 179/100.2 CA, 100.2 P

[56] References Cited

UNITED STATES PATENTS

| | | | |
|---|---|---|---|
| 3,702,461 | 11/1972 | Cantwell | 340/174.1 E |
| 3,599,193 | 8/1971 | Cote | 340/174.1 E |
| 3,105,964 | 10/1963 | Kanamuller | 340/174.1 E |

*Primary Examiner*—Vincent P. Canney

*Attorney, Agent, or Firm*—Limbach, Limbach & Sutton

[57] ABSTRACT

A flexure for mounting a recording head slider to an access arm in a disk recording machine which provides stiffness in certain translational and rotational directions and flexibility in other direction, the flexure having a rectangular frame of a leaf spring material secured at two opposite points to a recording head slider and secured at three discrete points to the access arm.

4 Claims, 4 Drawing Figures

RECORDING HEAD FLEXURE

BACKGROUND OF THE INVENTION

In the art of recording on magnetic disks, a disk format comprising a plurality of concentric recording tracks is used to define the position of a magnetic recording head over a disk that is rotated at high speed. To read or record information on the recording disk the recording head is linearally moved to a discrete location over the disk. At this location a stationary head reads or records on a track defined by the relative movement of the rotating disk to the stationary head.

To obtain a maximum density of available information on a disk, the tracks in a disk format are spaced as closely together as the mechanical limitations of the accessing mechanism will permit. Other limitations, such as the electromagnetic performance characteristics of the recording head are not here considered.

Ideally, a recording transducer or head rigidly mounted to the end of an access arm will restrict such mechanical limitations to the mechanical tolerances in an actuating mechanism which moves the access arm over the disk. However, in order to allow the closest proximity of the recording head to the disk surface possible, the recording head is floated over the surface of the disk on an air bearing surface created by the high speed rotation of the disk. In this manner the recording head is mounted in an aerodynamically designed slider or shoe.

To maintain a constant flying height the slider must have a degree of flexibility in order to conform to physical variations and imperfections in the surface of the disk. For example, the slider can be mounted to the access arm in a gimbal ring which permits a multidirectional pitch and roll in the slider relative to the recording disk. However, pivotal connections of a gimbal ring allows a perceptible drift to the recording head which make the arrangement unsuitable for high density recording. A preferred method of supporting the slider to an access arm is by the use of a flexure. The flexure comprises a thin flat rectangular frame of a spring material which encircles the periphery of the slider. A flexure of this type is described in U.S. Pat. No. 3,544,980, issued Dec. 1, 1970 to R.A. Applequist et al. Heretofore, it has been the practice to secure the flexure to an access arm at two opposite points on diametric sides of the flexure. Similarly the slider was secured to the flexure on the two remaining sides. It has been discovered, however, that when the number of tracks are increased in high density recording, certain previously insignificant instability conditions become manifest.

SUMMARY OF THE INVENTION

This invention relates to an improved flexure for use in an arm assembly flexure for flexibly supporting a recording transducer in a disk storage machine. The flexure is formed of a thin flat rectangular frame of a leaf spring material which encompasses a recording transducer slider.

The flexure is attached to the forward and aft points of a slider relative to the rotating surface of a recording disk, at two points on opposite sides of the flexure. The flexure is also fixed to a supporting cantilevered member in the arm assembly at three discrete points: one point at the center of the side of the flexure adjacent the distal end of the cantilevered member; and one point at each corner of the side of the flexure removed from the distal end of the cantilevered member. It has been discovered that this arrangement permits a necessary degree of roll and pitch to the slider mounted to the flexure, but restricts spin and linear translations of the slider parallel to a recording disk. These latter movements tend to displace the slider and hence a recording transducer mounted therein from a recording track and thus substantially affect the performance of the disk storage machine. Further restriction of these undesirable movements is obtained by increasing the cross section of certain portions of the flexure relative to the other portions. In this manner the flexure of this invention allows a recording slider the necessary freedom to conform to physical irregularities and imperfections in the surface of a disk, but sufficient restraint to prevent the slider and contained recording transducer from drifting from an accessed track on the disk.

Figure 1:
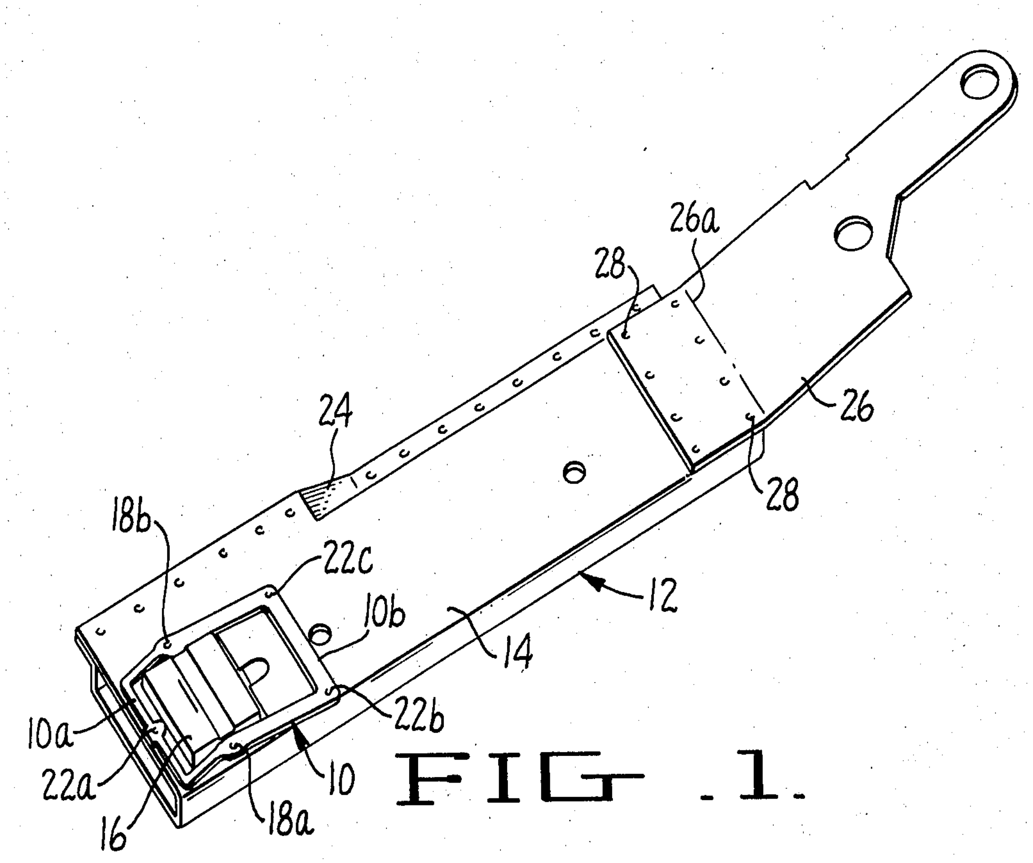
FIG. 1 is a perspective view of an arm assembly.

Referring to the perspective view of FIG. 1, the improved flexure 10 is shown as an element of a preferred arm assembly 12. Included in the arm assembly is a cantilevered member 14 having a novel box construction which is the subject of the patent application of Ronald W. Higgins and Donald J. Massaro entitled, "Disk Recorder Arm Assembly," assigned to the same assignee and filed the same day as this application.

The flexure 10 is substantially rectangular and comprises a flat leaf spring formed in a frame-like configuration arranged around and supporting a slider 16. The slider is mounted across the flexure and fastened thereto by spot welds **18*a* and 18*b*, which weld the flexures 10 to two protruding steel weld lugs 20*a* and 20*b*, shown in FIG. 4. The positioning of the slider 16 on the flexure 10 effectively divides the flexure into two portions, an outward portion 10*a* adjacent the distal end of the arm assembly and an inward portion 10*b* displaced from the end of the arm assembly. As shown in FIG. 1, the frame-like configuration of the outward portion 10*a* is of substantially smaller dimension than the inward portion 10*b*. This configuration provides the outward portion 10*a* with a greater degree of flexibility. To add to this flexibility, the outward portion is secured to the cantilevered member of the arm assembly by a single centrally located spot weld 22*a*, whereas the inward portion is secured to the cantilevered member by two corner located spot weld, 22 *b* and 22*c***. The purpose of this arrangement will be discussed in greater detail with reference to FIG. 2.

The preferred arm assembly is usable in the general type of magnetic recording disk drive described in U.S. Pat. No. 3,544,980 issued December, 1970 to R.A. Applequist et al. The cantilevered member is provided with a cam ramp 24 for use in a cam ramp method of loading the slider onto a recording disk as described in the referenced patent. To provide a positive force, biasing the slider against a disk, the arm assembly includes a load spring 26 fastened to the cantilevered member 14 by spot welds 28. The load spring 26 comprises a leaf spring from which the remaining arm assembly is cantilevered. The bias is obtained by a bend 26a in the spring causing a bias to be developed when the leaf spring and cantilevered member are maintained substantially parallel to one another by the forced loading of the slider on a recording disk.

Figure 3:
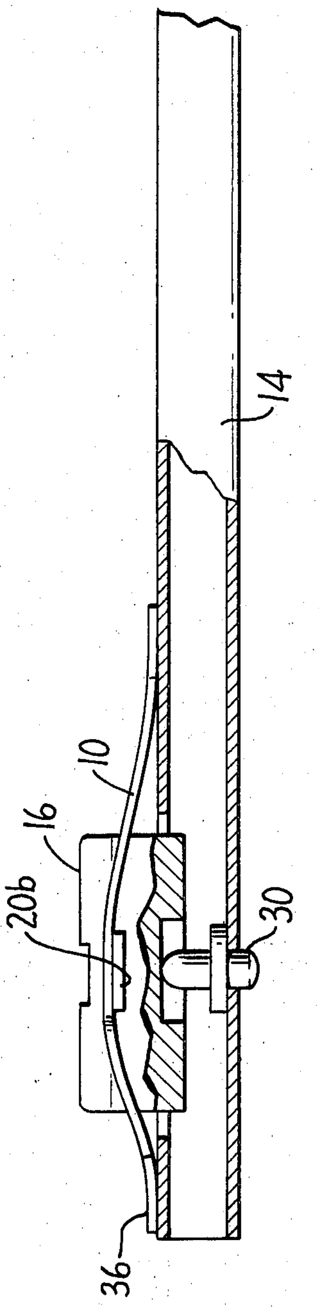
FIG. 3 is a fragmentary elevational view of the arm assembly of FIG. 1.

The force of the spring bias is transmitted to the slider through the cantilevered member 14 by a load button 30, shown in the fragmentary view of the arm assembly in FIG. 3. The load button 30 is directed on the centroidal axis of the slider and permits the force of the load spring to counter the force generated by an air layer against the slider which tends to lift the slider. The air layer is developed by the high speed rotation of a recording disk and provides a bearing surface on which the aerodynamically designed slider "flies." In high density recording, the height of the slider above the surface of a disk must be minimized. Hence, a loading force is required to counter the lift from the air layer and maintain the slider in close proximity to the surface of the disk. In this manner a recording transducer or head integrally fixed in the slider can read or write on a track of optimally narrow width.

When flying at a minimal height, a slider must be able to conform to physical surface imperfections in the recording disk. In this respect the slider must be permitted a degree of pitch and roll. This is of course the purpose of the flexure which connects the slider to the remaining relatively rigid arm assembly. However, while permitting a degree of pitch and roll, the flexure must inhibit spin and linear translations parallel to the surface of the disk which would tend to displace the head from a track being followed.

Figure 2:
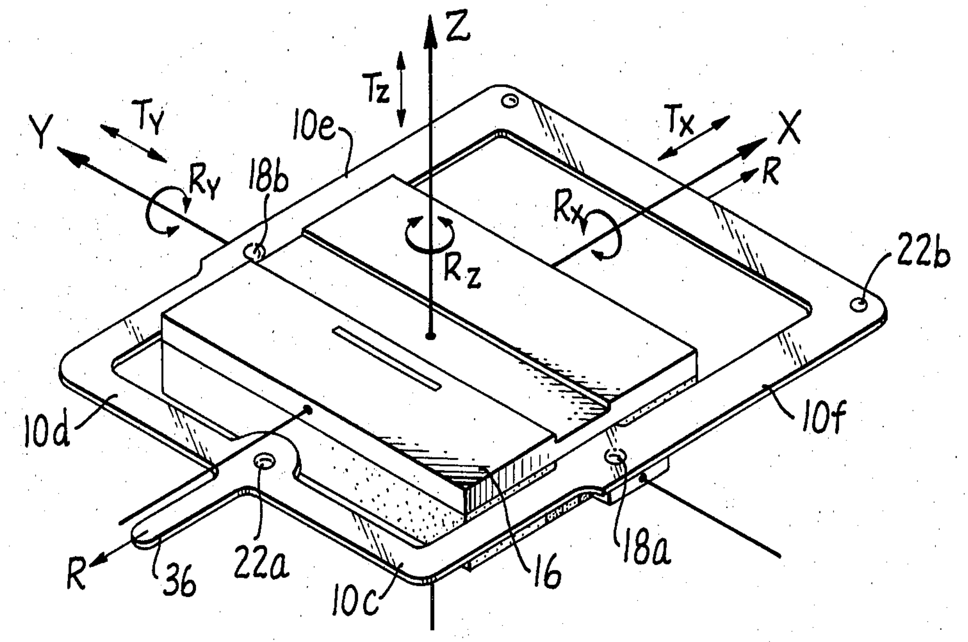
FIG. 2 is a schematic view of the flexure and slider in the arm assembly of FIG. 1.

The manner of attaining these dynamic characteristics is described with reference to the schematic illustration of FIG. 2. The slider 16 in FIG. 2 has imposed thereon coordinate axis X,Y and Z, centered on the centroidal center of the slider. Six possible degrees of freedom are shown; three in translation along the axes (Tx, Ty,Tz), and three in rotation about the axes (Rx, Ry, Rz). To obtain these optimum characteristics it is desired that Rx, Ry, and Tz be of low stiffness and that Rz, Tx, and Ty be of high stiffness. The stiffness of Tz is determined by the load spring 26 in FIG. 1 and is not controlled by the flexure 10.

The low stiffness of Rx and Ry is achieved by the small cross section and right angle configuration of the flexure legs 10*c* and 10*d* of the flexure which is secured at its outward portion 10*a* by the single weld spot 22*a*.

The high stiffness of Rz, Tz, and Ty is achieved by the relatively greater cross section of legs, 10*e* and 10*f* and by the securing of the legs at weld spots 22*b* and 22*c*.

In this manner pitch about axis X and roll about axis Y are permitted by the long flexure legs 10*e* and 10*f* and the right angle legs 10*c* and 10*d*. Translation along the Y-axis and spin about the Z-axis are restricted by the beam effect of the wide flexure legs 10*e* and 10*f*. Translation along the X-axis, which must be restricted from even the smallest displacement, is prevented by the straight line connections of the slider defined by weld points 18*a* and 22*b*, and 18*b* and 22*c*, respectively. To insure that translation along the X-axis is prevented a preload "R" is applied to the flexure before the final weld to the arm. This assures that the flexure is always in tension.

Figure 4:
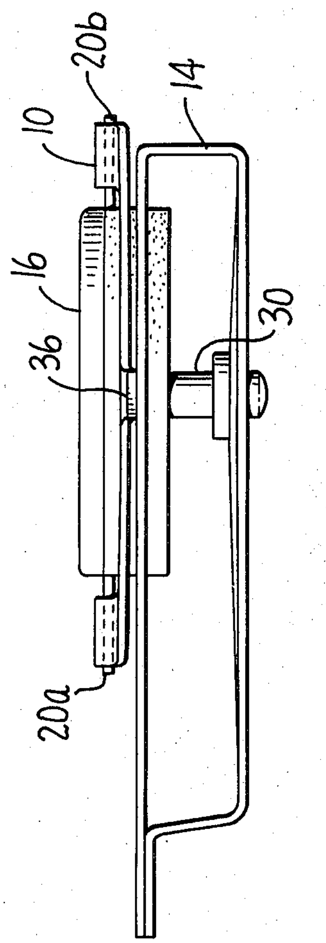
FIG. 4 is a cross sectional view taken on the lines 3—3 in FIG. 3.

The manner in which the flexure is deformed by the load button is illustrated with reference to FIG. 3 and 4. The load button 30 is seated in a hole in the cantilevered member 14 and is directed against the back of the slider as shown. The slider is retained against the load button by the deformed flexure 10, which as noted above is provided with a tension before the final weld In this respect the flexure is fiexed at weld points 22*b* and 22*c* and the flexure is preloaded by drawing on a tab 36 before the flexure is finally fixed at weld point 22*a*. The tab 36 is then removed.

I claim:

1. An improved arm assembly for a disk drive recording machine having a cantilevered member, a load button fixed to the end of the cantilevered member and a recording transducer slider in contact with the load button wherein the improvement comprises a flexure of a thin flat spring material formed in a frame around the slider on at least three sides, said flexure being secured to the cantilevered member at a first point substantially at the center of a first side of the flexure adjacent the free end of the cantilevered member and at second and third points at the distal end of each of a second side and a third side adjoining said first side and directed from the end of the cantilevered member, and being secured to opposite ends of the slider at corresponding fourth and fifth points at the middle of the second and third sides.

2. The arm assembly of claim 1 wherein the portion of the flexure between said fourth point and said first point, and said fifth point and said first point is generally of narrower width than the portion of the flexure between said fourth point and said second point and said fifth point and said third point.

3. The arm assembly of claim 2 wherein the segment of the flexure between said fourth point and the juncture of said first side and said second side, and the corresponding segment between said fifth point and the juncture of said first side and said third side, is substantially shorter than the segment of the flexure between said fourth point and said second point and the corresponding segment between the fifth point and the third point.

4. The arm assembly of claim 1 wherein said flexure is placed in tension before being secured to said cantilevered member.

* * * * *

UNITED STATES PATENT OFFICE

CERTIFICATE OF CORRECTION

Patent No. 3,805,290 Dated April 16, 1974

Inventor(s) Herbert E. Thompson

It is certified that error appears in the above-identified patent and that said Letters Patent are hereby corrected as shown below:

On the cover sheet in item [75] the following names should be added.

--Howard W. Steinhoff, San Jose, Calif. and
Syed H. Iftikhar, San Jose, Calif.--.

Signed and Sealed this

*sixth* Day of *April 1976*

[SEAL]

*Attest:*

RUTH C. MASON
*Attesting Officer*

C. MARSHALL DANN
*Commissioner of Patents and Trademarks*